Nov. 1, 1960
C. S. MOORE
2,958,201
FENCE POST DRIVER
Filed March 5, 1958
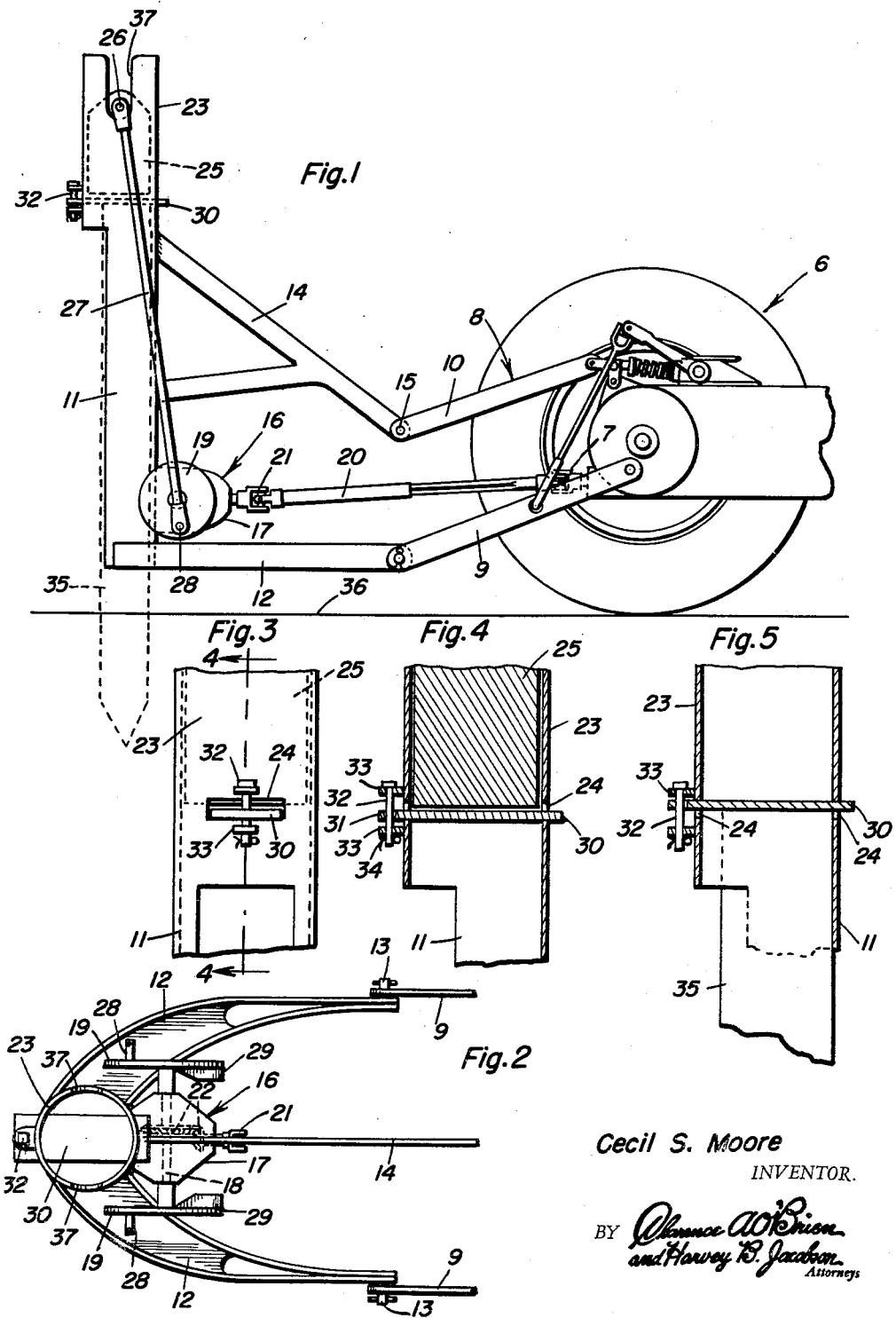
Cecil S. Moore
INVENTOR.

2,958,201

Patented Nov. 1, 1960

2,958,201

FENCE POST DRIVER

Cecil S. Moore, Cureall, Mo.
(Davis Creek Rte., West Plains, Mo.)

Filed Mar. 5, 1958, Ser. No. 719,432

2 Claims. (Cl. 61—74)

The present invention relates to new and useful improvements in drivers particularly for fence posts and has for its primary object to provide, in a manner as hereinafter set forth, a machine of this character which is adapted to be readily mounted on the rear end of a conventional farm tractor for actuation thereby.

Another very important object of the invention is to provide a driver of the reciprocating hammer-type wherein the weight of the machine is utilized to assist in driving the post.

Still another important object of the invention is to provide a driver of the aforementioned character which is adapted to drive posts of various sizes.

Other objects of the invention are to provide a fence post driver of the character set forth which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, showing a fence post driver constructed in accordance with the present invention in use on a tractor;

Figure 2 is a top plan view of the device with parts omitted;

Figure 3 is a fragmentary view in front elevation of the lower portion of the cylinder;

Figure 4 is a fragmentary view in vertical section, taken substantially on the line 4—4 of Figure 3; and Figure 5 is a fragmentary view in vertical section substantially similar to Figure 4 but with the hammer omitted and showing the device mounted on a post.

Referring now to the drawing in detail, it will be seen that reference character 6 designates the rear end portion of a farm tractor of the type constituting the subject matter of U.S. Patent No. 2,118,180, issued May 24, 1938, to Harry George Ferguson, said tractor including the usual power take-off 7. The tractor 6 further includes a conventional hydraulic linkage system 8, said system comprising the usual tension links 9, a compression link 10, etc.

The embodiment of the present invention which has been illustrated comprises a vertical, substantially semicylindrical guide 11 of suitable metal. The guide 11, which may also be of any desired dimensions to accommodate posts of various sizes, has fixed on its lower end portion a pair of arcuate fabricated metallic supporting arms 12. The arms 12 are pivotally mounted at 13 on the tension links 9 of the system 8. Fixed on the upper portion of the guide 11 is a substantially Y-shaped arm 14 which is pivotally connected at 15 to the compression link 10. Thus, the guide 11 is mounted on the linkage system 8 of the tractor 6 to be raised and lowered thereby.

Mounted on the lower portion of the guide 11 is a transmission 16 comprising a housing 17 in which a transverse shaft 18 is journalled. The end portions of the shaft 18 project from the housing 17 and have fixed thereon pitman wheels 19. A telescopic shaft 20 operatively connects the transmission 16 to the power take-off 7 of the tractor 6, said shaft including a universal joint 21. Gears 22 in the housing 17 connect the driveshaft 20 to the shaft 18.

On the upper end of the guide 11 and communicating therewith is a cylinder 23 having diametrically opposite, circumferential slots or openings 24 in its lower portion. A hammer 25 is mounted for reciprocation in the cylinder 23. Mounted on the upper end portion of the hammer 25 is a wrist pin 26. Pitmans 27 have one end journalled on the wrist pin 26. The other ends of the pitmans 27 are pivotally connected off-center at 28 to the wheels 19. The pitman wheels 19 are counter-balanced as indicated at 29.

Mounted for limited vertical movement in the slots or openings 24 is a horizontal striker or stop plate 30. One end portion of the plate 30 is apertured as at 31 to slidably accommodate a retaining pin 32 mounted in apertured ears 33 on the cylinder 23. A cotter pin 34 secures the pin 32 in the ears 33.

It is thought that the operation of the machine will be readily apparent from a consideration of the foregoing. Briefly, the post to be driven, as indicated at 35, is positioned at the desired location on the ground 36 and the guide 11 is engaged with said post. Through the medium of the hydraulic linkage system 8 of the tractor 6, the machine is then lowered for bringing the plate 30 to rest on the upper end of the post as seen in Figure 5 of the drawing, said post now projecting into the lower end portion of the cylinder 23 and supporting substantially all of the weight of the machine. The tractor 6 is then caused to drive the shaft 20 for reciprocating the hammer 25 in the cylinder 23 through the pitmans 27 and the transmission 16. As seen in Figure 5 of the drawing, when the hammer 25 is in retracted or raised position the plate 30, resting on the upper end of the post 35, is in the upper portions of the openings 24. As the hammer 25 approaches the end of its downstroke it strikes the floating plate 30 and the blow is transmitted to the post through said plate. The construction and arrangement of parts is such that when the hammer 25 strikes the plate 30 and drives it downwardly, and if the resistance offered by the post 35 is sufficient, the machine is slightly elevated. Thus, substantially all of the weight of the machine is maintained on the post to assist in driving said post. Vertical slots or recesses 37 in the upper end portion of the cylinder 23 accommodate the wrist pin 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fence post driver comprising a vertical cylinder open at its ends, a depending, substantially semi-circular post guide integral with the lower end of the cylinder and communicating therewith, means for mounting the cylinder on a tractor, a hammer mounted for reciprocation in the cylinder, means for actuating the hammer, said cylinder having diametrically opposite, circumferentially extending slots in its lower portion, an elongated, vertically movable, horizontal impact plate floatingly mounted in the slots and engageable with the top of the post for supporting the cylinder thereon, said plate further being engageable by the hammer for transmitting the blow thereof to the post, and means for retaining the plate in the slots.

2. A fence post driver comprising a vertical cylinder open at its ends, a depending, substantially semi-circular post guide integral with the lower end of the cylinder and communicating therewith, means for mounting the cylinder on a tractor, a hammer mounted for reciprocation in the cylinder, means for actuating the hammer, said cylinder having diametrically opposite, circumferentially extending slots in its lower portion, an elongated, vertically movable, horizontal impact plate floatingly mounted in the slots and engageable with the top of the post for supporting the cylinder thereon, said plate further being engageable by the hammer for transmitting the blow thereof to the post, and means for retaining the plate in the slots, the end portions of said plate projecting beyond the cylinder, one of said end portions having an opening therein, the last named means including apertured ears on the cylinder above and below the plate, and a vertical pin mounted in said ears and loosely engaged in the opening.

References Cited in the file of this patent

UNITED STATES PATENTS

| | | |
|---|---|---|
| 109,745 | Lansing | Nov. 29, 1870 |
| 785,899 | Lawler | Mar. 28, 1905 |
| 1,015,421 | Burhop | Jan. 23, 1912 |
| 2,118,180 | Ferguson | May 24, 1938 |
| 2,392,027 | Cutrer | Jan. 1, 1946 |
| 2,557,873 | Jarrell | June 19, 1951 |
| 2,659,583 | Dorkins | Nov. 17, 1953 |
| 2,825,207 | Cullum | Mar. 4, 1958 |